(12) United States Patent
Grafi et al.

(10) Patent No.: US 9,047,293 B2
(45) Date of Patent: Jun. 2, 2015

(54) COMPUTER FILE FORMAT CONVERSION FOR NEUTRALIZATION OF ATTACKS

(75) Inventors: Aviv Grafi, Ramat-Gan (IL); Itay Glick, Ramat-Hasharon (IL)

(73) Assignees: Aviv Grafi, Ramat-Gan (IL); Itay Glick, Ramat-Hasharon (IL)

( * ) Notice: Subject to any disclaimer, the term of this patent is extended or adjusted under 35 U.S.C. 154(b) by 78 days.

(21) Appl. No.: 13/557,239

(22) Filed: Jul. 25, 2012

(65) Prior Publication Data
US 2014/0032505 A1 Jan. 30, 2014

(51) Int. Cl.
G06F 17/30 (2006.01)

(52) U.S. Cl.
CPC ................................ *G06F 17/30076* (2013.01)

(58) Field of Classification Search
CPC .................................................. G06F 17/30076
USPC .......... 709/206; 726/3, 22, 23, 24; 348/14.13; 386/282; 382/317; 375/240.12; 715/200; 713/188; 707/691, 692, 809
See application file for complete search history.

(56) References Cited

U.S. PATENT DOCUMENTS

| | | | | |
|---|---|---|---|---|
| 4,654,484 | A * | 3/1987 | Reiffel et al. ............... | 348/14.13 |
| 5,164,839 | A * | 11/1992 | Lang ............................. | 386/285 |
| 6,324,334 | B1 * | 11/2001 | Morioka et al. .............. | 386/282 |
| 7,185,017 | B1 | 2/2007 | Cauvin et al. | |
| 7,263,561 | B1 * | 8/2007 | Green et al. .................. | 709/246 |
| 7,797,743 | B2 * | 9/2010 | Treacy et al. .................... | 726/22 |
| 8,180,837 | B2 * | 5/2012 | Lu et al. ......................... | 709/206 |
| 8,185,954 | B2 * | 5/2012 | Scales ............................. | 726/22 |
| 8,745,742 | B1 * | 6/2014 | Satish et al. ..................... | 726/24 |
| 8,763,128 | B2 * | 6/2014 | Lim et al. ........................ | 726/24 |
| 2003/0229810 | A1 * | 12/2003 | Bango ........................... | 713/201 |
| 2005/0257045 | A1 * | 11/2005 | Bushman et al. ............. | 713/156 |
| 2007/0056035 | A1 * | 3/2007 | Copley ............................ | 726/22 |
| 2007/0087766 | A1 * | 4/2007 | Hardy et al. .................. | 455/466 |
| 2008/0209551 | A1 | 8/2008 | Treacy et al. | |
| 2009/0150419 | A1 * | 6/2009 | Kim et al. ..................... | 707/101 |
| 2009/0282484 | A1 * | 11/2009 | Wiseman et al. ............... | 726/24 |
| 2010/0115620 | A1 * | 5/2010 | Alme ............................. | 726/24 |
| 2012/0167206 | A1 * | 6/2012 | Reetz-Lamour et al. ....... | 726/22 |
| 2013/0081065 | A1 * | 3/2013 | Sharan et al. ................. | 719/318 |

FOREIGN PATENT DOCUMENTS

WO  WO2011014623  2/2011

OTHER PUBLICATIONS

Lanjia Wang et al., "Thwarting Zero-Day Polymorphic Worms With Network-Level Length-Based Signature Generation", Feb. 2010, IEEE/ACM Transactions on Networking, vol. 18, No. 1, pp. 53-66.*
National Security Agency; Hidden Data and Metadata in Adobe PDF Files: Publication Risks and Countermeasures; Jul. 27, 2008.

* cited by examiner

*Primary Examiner* — Scott A Waldron
(74) *Attorney, Agent, or Firm* — Oren Reches

(57) ABSTRACT

A method and a non-transitory computer readable medium that stores instructions for converting a first file of a first format to a second file of a second format that differs from the first format; wherein the converting comprises converting first file fields having invalid values with second file fields having valid values; and converting the second file to a third file of the first file format, if the converting of the first file to the second file succeeds.

14 Claims, 3 Drawing Sheets

COMPUTER FILE FORMAT CONVERSION FOR NEUTRALIZATION OF ATTACKS

BACKGROUND OF THE INVENTION

Computerized systems play a major role in modern life. Almost all businesses, organizations and persons utilize computerized systems. Due to their significance computerized systems are under constant attacks and new threats are being developed and deployed on a daily basis.

Signature based attack neutralization efforts is based on a comparison of information to signatures of already known attacks and can malfaunction when unknown or targeted attacks are deployed.

There is a growing need to provide a computer readable medium, a method and a system for neutralizing attacks.

SUMMARY

According to an embodiment of the invention a method may be provided and may include performing any of the claimed stages and any of the stages described in the specificaiton.

Further embodiments of the invention include a computer readable medium that is non-transitory and may store instructions for performing the above-described methods and any steps thereof, including any combinations of same. For example, the computer readable medium may store instructions for executing any of the claimed stages and any of the stages described in the specificaiton.

A non-transitory computer readable medium that stores instructions for:
converting a first file of a first format to a second file of a
  second format that differs from the first format; wherein the
  converting comprises converting first file fields having
  invalid values with second file fields having valid values;
  and
converting the second file to a third file of the first file format,
  if the converting of the first file to the second file succeeds.

The second format imay be expected to be immune to attempts to exploit vulnerabilities of the first format.

The non-transitory computer readable medium may store instructions for finding the first file fields having invalid values by comparing lengths of first file fields to expected lengths of the first file fields.

The non-transitory computer readable medium may store instructions for truncating a first file field having a length that exceed an expected lengths of the first file field.

The non-transitory computer readable medium may store instructions for finding the first file fields having invalid values by comparing values of first file fields to allowable values of the first file fields.

The first file and the third file may be are similar to each other.

The second format may preserve at least a portion of a functionality of the first format. For example, if both formats are word processing formats that they both support multiple word processing functionality.

The first file comprises first file image fields and the non-transitory computer readable medium may store instructions for converting the first file image fields to second file image fields on a pixel to pixel basis.

The first file comprises first file image fields and the non-transitory computer readable medium may store instructions for converting the first file image fields to second file image fields of a raw format.

The first file comprises tagged image file format (TIFF) image fields.

The non-transitory computer readable medium may store instructions for converting the TIFF image fields to bitmap fields.

The first file may comprise portable network graphics (PNG) image fields.

The non-transitory computer readable medium may store instructions for converting the PNG image fields to bitmap fields.

The first file comprises enhanced metafile format (EMF) image fields.

The non-transitory computer readable medium may store instructions for converting the EMF image fields to bitmap fields.

The first file comprises joint photographic experts group (JP2) image fields.

The non-transitory computer readable medium may store instructions for converting the JP2 image fields to bitmap fields.

The non-transitory computer readable medium may store instructions for converting a first file of a first video format to a second file of a second video format.

The non-transitory computer readable medium may store instructions for converting a first file of a first audio format to a second file of a second audio format.

The non-transitory computer readable medium may store instructions for receiving a compressed file and applying at least one decompression operation on the compressed file to provide the first file.

The non-transitory computer readable medium may store instructions for sending the third file to a repository and preventing the repository from receiving the first file.

The non-transitory computer readable medium may store instructions for converting a first file of a first text editing format to a second file of a second text editing format.

Additional embodiments of the invention include a system arranged to execute any or all of the methods described above, including any stages—and any combinations of same.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
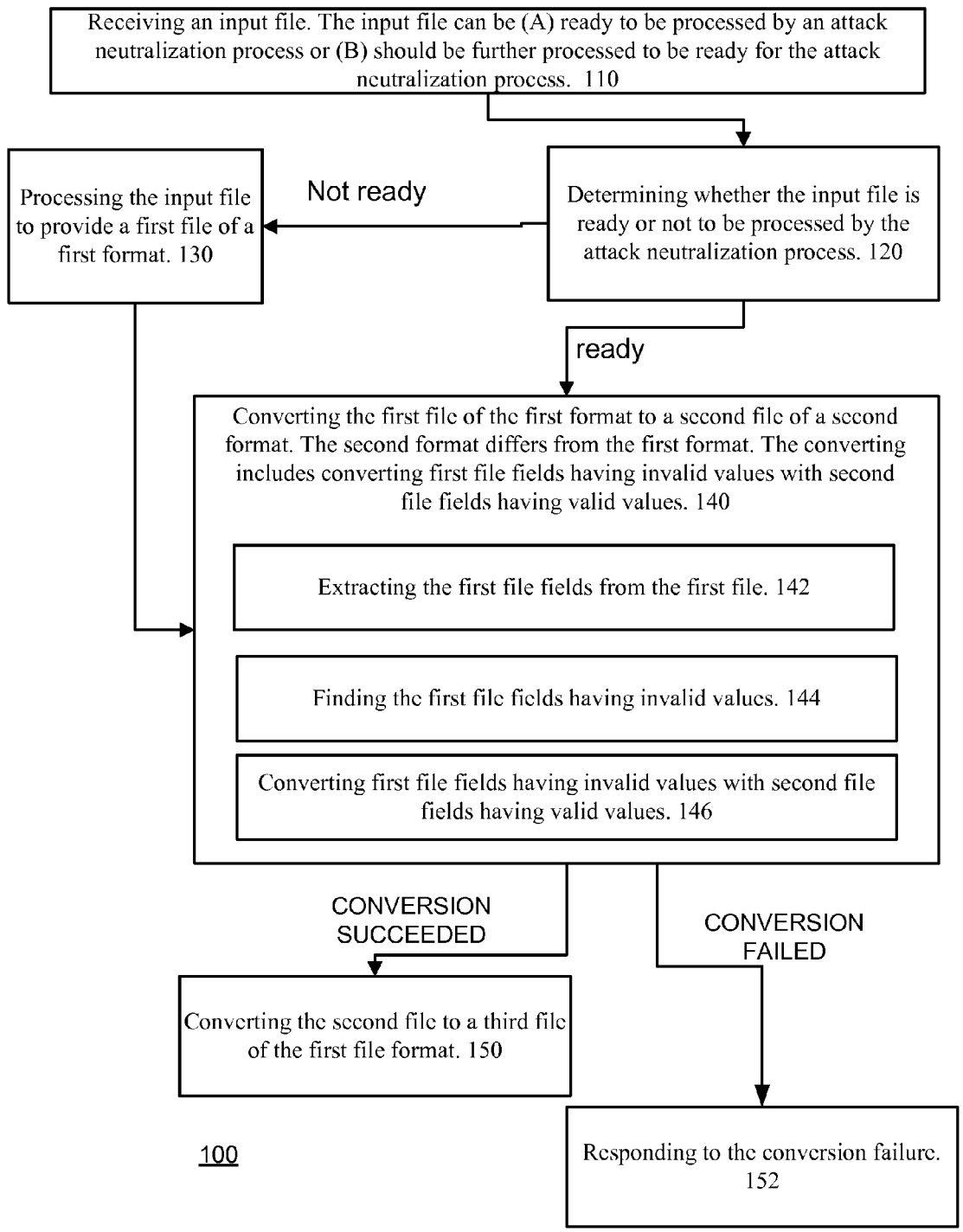
FIG. 1 illustrates a method according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

FIG. 1 illustrates method 100 according to an embodiment of the invention.

Method 100 may start by stage 110 of receiving an input file. The input file can be (A) ready to be processed by an attack neutralization process or (B) should be further processed to be ready for the attack neutralization process.

Stage 110 may be followed by stage 120 of determining whether the input file is ready or not to be processed by the attack neutralization process. Stage 120 may include determining whether the input file is compressed or not.

If it is determined that the input file is not ready then stage 120 is followed by stage 130 of processing the input file to provide a first file of a first format. The processing may include decompressing the input file, decoding the input file, decrypting the input file and the like. Stage 130 can include one or more iterations of decompression—as the first file of the first format should be decompressed. Stage 130 is followed by stage 140.

If it is determined that the input file is ready to be processed by the attack neutralization process then stage 120 is followed by stage 140 and the input file is regarded as a first file of a first format.

Stage 140 may include converting the first file of the first format to a second file of a second format. The second format differs from the first format. The converting includes converting first file fields having invalid values with second file fields having valid values.

The second format can be a raw format. Raw format can be a format that is flatten, usually without compression, format-specific tags or optimization. For image a bitmap format can be chosen. A raw audio format can be a format for storing uncompressed audio in raw form. Raw forma audio files do not include header information (fields such as endian, number of channels, bit depth or audio sampling rate) in comparison to formats such as AIFF or WAV formats.

Stage 140 may include converting a first file of a first text editing format (such as WORD format of Microsoft to a second file of an OpenDocument format).

The first format can be supported or developed by a first vendor while the second format can be developed or supported by a second vendor.

The first format and the second formats can be different structured file formats.

Given the first format, the second format can be selected to be expected to be exposed to different vulnerabilities, to be developed by a different vendor, to operate in a different manner while allowing an at least partial construction of the first file of the first format and the like. The selection is made in advance and the conversion can be done automatically—without user interference.

Although the first and second formats differ from each other they may preserve most or all of the functionality of the first format. The first and second formats may be interchangeable in a sense that the content of a first file that does not include invalid first file fields is almost the same as the content of the third file.

It is noted that the conversion is not necessarily required to preserve all the content of the first file and that some errors related to the format conversions may be allowed.

Furthermore, it may be desirable to perform a format conversion that still allows performing on the second file at least a subset of the operations that can be performed on the first file. For example, if the first format is an editable format then the second format may also facilitate editing the second file. Yet for another example—pictures of the first file should be replaced by pictures of the second file.

The first file can include first file image fields. The first file image fields can be, for example, tagged image file format (TIFF) image fields, portable network graphics (PNG) image fields, enhanced metafile format (EMF) image fields or joint photographic experts group 1000 (JP2) image fields. The files may include Microsoft Office format, Audio-Video format, Text formats and more.

Stage 140 may include stages 142, 144 and 146.

Stage 142 may include extracting the first file fields from the first file.

Stage 144 may include finding the first file fields having invalid values.

Stage 144 may include at least one of the following stages:
a. Comparing lengths of first file fields to expected lengths of the first file fields.
b. Comparing values of first file fields to allowable values of the first file fields.

Stage 146 may include converting first file fields having invalid values with second file fields having valid values.

Stage 146 may include:
a. Truncating a first file field having a length that exceeds an expected length of the first file field.
b. Mapping invalid values to values within allowable values.
c. Converting invalid first file image fields to valid second file image fields.
d. Converting invalid first file image fields to valid second file image fields on a pixel to pixel basis.
e. Converting invalid first file image fields to valid second file image fields of a bitmap or other image format.

Stage 140 may be followed by stage 150 or stage 152. Stage 140 is followed by stage 150 if the conversion succeeded. Stage 140 may be followed by stage 152 if the conversion failed. The failure of the conversion can be indicative of a presence of a malicious code.

Stage 152 includes responding to the conversion failure. The user can be notified about the failure, an attack alert can be generated, the first file can be declared as an infected file and can be deleted, quarantined or not sent to other computers.

Stage 140 is followed by stage 150 of converting the second file to a third file of the first file format.

The first file and the third file should be similar to each other. They may include substantially the same content (except the invalid fields) and may, for example, result in a display of substantially the same image. The third and first files can have the same name.

According to various embodiments of the invention there may be executed more than two conversions. For example, the first file of the first format can be converted to a second file of a second format, the second file of the second format may be converted to an intermediate file of an intermediate format and the intermediate file of the intermediate format can be converted to the first file of the third format. At least some of the conversions may include converting file fields having invalid values with file fields having valid values.

The different formats can be supported by different software vendors or by the same software vendor. The different formats may be selected such as to exhibit different vulnerabilities.

The following non-limiting examples illustrate various attacks that are neutralized by applying any of the mentioned above methods.

A format of a malicious file may include a valid structured format header, invalid structured data that includes vulnerability-specific data that affects target application or operation system, and a shell code—a (usually small) piece of code use as the payload in the exploitation of a software vulnerability.

TIFF Format/Exploiting Adobe PDF Reader libtiff

Various publication that describe how such a vulnerability is exploited can be found in the following links:
a. http://blog.fortinet.com/cve-2010-0188-exploit-in-the-wild/
b. http://downloads.securityfocus.com/vulnerabilities/exploits/19283
c. https://bugzilla.redhat.com/attachment.cgi?id=132539&action=diff#tiff-3.8.2/libtiff/tif_dirread.c_sec17

The key for cybercriminals to exploit CVE-2010-0188 here is to embed a malicious TIFF image in the PDF document. The uncompressed and decoded TIFF image reveals the real attack vector—the count value in DotRange type field.

The vulnerable plugin AcroForm.api (version 9.0.148) uses this count value without sufficient sanitization.

While the target buffer is a two bytes field on the stack, a memcpy instruction copies the multiple DotRange values (way more than 2 bytes) there. As a matter of course, this effectively smashes the stack and overwrites the return address pointing to the embedded Shell-Code (payload) address hiding as legit JavaScript Code.

The vulnerability is in client libtiff library as TIFFFetchShortPair( ) that should copy 2 bytes to an output buffer copies much more data overwriting the stack which leads to malicious code execution.

A TIFF section consists of the following TIFFFieldInfo structure:

```
typedef struct {
ttag_t  field_tag; /* field's tag */
short   field_readcount; /* read count/TIFF_VARIABLE/TIFF_SPP */
short   field_writecount; /* write count/TIFF_VARIABLE */
TIFFDataType field_type; /* type of associated data */
/* ...   more fields ... */
      } TIFFFieldInfo;
```

This field acts as a rendering instruction to the viewer/vulnerable application.

By crafting a special TIFFFieldInfo an attacker can easily overflow target internal buffer by instructing it to copy 100 bytes instead of 2 (TIFF_SHORT) to a 2 bytes buffer. For example:

| Field Name | Field Size in Bytes | Legitimate Value | Malicious Value |
|---|---|---|---|
| tag | 4 | TIFFTAG_DOTRANGE | TIFFTAG_DOTRANGE |
| Type | 1 | TIFF_SHORT | TIFF_SHORT |
| readcount | 2 | 1 | 100000 |
| Writecount | 2 | 1 | 100000 |

The conversion process reads and validates every tag and converts it to a flat format (Bitmap) and rebuilds the TIFF from flat image. The same malicious tag will be rebuilt without the invalid values as following:

| Field Name | Field Size in Bytes | Legitimate Value | Malicious Value | Post Conversion |
|---|---|---|---|---|
| tag | 4 | TIFFTAG_DOTRANGE | TIFFTAG_DOTRANGE | TIFFTAG_DOTRANGE |
| type | 1 | TIFF_SHORT | TIFF_SHORT | TIFF_SHORT |

-continued

| Field Name | Field Size in Bytes | Legitimate Value | Malicious Value | Post Conversion |
|---|---|---|---|---|
| readcount | 2 | 1 | 100000 | 1 |
| writecount | 2 | 1 | 100000 | 1 |

The vulnerability is successfully neutralized by converting the TIFF to a Bitmap format and converting it back to TIFF format.

The shell code itself hides as JavaScript code in the PDF. The shell code is successfully disarmed by converting the PDF to a PostScript format and converting it back to PDF. During this process, the shell code that embeds as JavaScript is modified making it unusable by the attacker.

PDF Format/Exploiting Foxt PDF Reader #2

Various publication that describe how such a vulnerability is exploited can be found in the following links a. http://www.corelan.be:8800/index.php/2010/11/13/offensive-security-exploit-weekend/
b. http://www.osvdb.org/68648

Foxit Reader is prone to an overflow condition. The program fails to properly sanitize the file title resulting in a stack buffer overflow. With a specially crafted PDF file, a context-dependent attacker can potentially execute arbitrary code.

The special PDF file consists of several sections called objs that describes the PDF layout including rendering properties as pages, fonts, links and content. The vulnerability is in one of the properties fields called Title that contained in a bad referenced obj section.

| Object ID and Reference | Property | Malicious Value | Post Conversion |
|---|---|---|---|
| 82 0 obj | | [BAD REFENCED] used to trigger the vulnerability | [Removed] |
| | /ViewerPreferences | /DisplayDocTitle true | [Removed] |
| Endobj | | | [Removed] |
| 80 0 obj | | | |
| | /CreationDate | (D:20100706110142+07'00') | (D:20100706110142+07'00') |
| | /Producer | (GPL Ghostscript 8.64) | (GPL Ghostscript 8.64) |
| | /ModDate | (D:20100717191247-07'00') | (D:20100717191247-07'00') |
| | /Title | (PaAAAAADDDDDDDDDDDD ........................ .VERY LARGE UNICODE STRING THAT INCLUDES A MALICOUS SHELL CODE...................) | [Removed] |
| Endobj | | | |

The conversion process reads and validates every object and tag and converts it to an open and common format (PostScript) and rebuilds the PDF from PostScript.

The converted PDF will have the exact same layout including text, images, fonts and links while bad referenced sections (as 82 0 obj in the above example) will be eliminated and the malicious obj will be rebuilt without the invalid values/Title tag in 80 0 obj.

The shell code itself hides as a bad referenced multipage obj sections in the PDF. The shell code is successfully disarmed by converting the PDF to a PostScript format and converting it back to PDF. During this process, the shell code removed making it unusable by the attacker.

PDF Format/Exploiting Adobe Reader

Various publication that describe how such a vulnerability is exploited can be found in the following links:
 a. http://blog.vulnhunt.com/index.php/2011/12/12/cve-2011-2462-pdf-0day-analysis/
 b. http://blog.9bplus.com/analyzing-cve-2011-2462
 c. http://web.nvd.nist.gov/view/vuln/detail?vulnId=CVE-2011-2462

CVE-2011-2462 Unspecified vulnerability in the U3D component in Adobe Reader and Acrobat 10.1.1 and earlier on Windows and Mac OS X, and Adobe Reader 9.x through 9.4.6 on UNIX, allows remote attackers to execute arbitrary code or cause a denial of service (memory corruption) via unknown vectors, as exploited in the wild in December 2011.

PDF Format/Exploiting Foxit PDF Reader

Various publication that describe how such a vulnerability is exploited can be found in the following link: http://cve.mitre.org/cgi-bin/cvename.cgi?name=2009-0836.

Foxit Reader 2.3 before Build 3902 and 3.0 before Build 1506, including 1120 and 1301, does not require user confirmation before performing dangerous actions defined in a PDF file, which allows remote attackers to execute arbitrary programs and have unspecified other impact via a crafted file, as demonstrated by the "Open/Execute a file" action. The vulnerability is successfully neutralized by converting the PDF to a PostScript format and converting it back to PDF.

PNG Format/Exploiting Photoshop and PaintShopPro

Various publication that describe how such a vulnerability is exploited can be found in the following links:
 a. http://www.securityfocus.com/bid/23698/info
 b. http://web.nvd.nist.gov/view/vuln/detail?vulnId=CVE-2007-2366
 c. http://downloads.securityfocus.com/vulnerabilities/exploits/23698.c Multiple Adobe products including Photoshop CS2/CS3, Photoshop Elements and Corel Paint Shop Pro are vulnerable to a stack-based buffer overflow, caused by improper bounds checking by the PNG.8BI Photoshop Format Plugin. By creating a specially-crafted .PNG file, a remote attacker could overflow a buffer and execute arbitrary code on the system or cause the application to crash by simply opening the malicious file.

The vulnerability is successfully detected and neutralized by converting the malicious PNG to a BMP format. During this process, we are able to avoid the malicious calculation as the resulting file opens successfully without triggering any malicious behavior.

A non-limiting example of an application log that records some failures is listed below. This example includes some error messages such as "CRC Error" and "PNG unsigned integer out of range" messages that indicates that the conversion failed:

convert.exe 07057.PNG-limit time 600-limit memory 100 m -limit map 100 m-resize 100%-quality 75 01188.jpg stdout:stderr:convert.exe: Incorrect pHYs chunk length 'C:\Users\i\AppData\
Local\Temp\qpath\1\07057.PNG'@warning/png.c/MagickPNG Warning Handler/1754.

convert.exe:pHYs:CRC error 'C: \Users\i\AppData\Local\Temp\qpath\1†07057. PNG' @warning/png.c/MagickPNGWarningHandler/1754.

convert.exe: PNG unsigned integer out of range '07057.PNG' @error/png.c/MagickPNGErrorHandler/1728.

convert.exe: Corrupt image '07057.PNG' @error/png.c/ReadPNGImage/3688.

convert.exe: missing an image filename '01188.jpg' @error/convert.c/ConvertImageCommand/3017.

EMF Format/Exploiting Microsoft Paint

Various publication that describe how such a vulnerability is exploited can be found in the following link:
http://www.abysssec.com/blog/2011/07/18/analysis-of-cve-2011-0041-vulnerability-in-gdi/.

The vulnerability exists in gdiplus!GpPath::CreateDashedPath function of gdiplus.dll that is responsible for bitmap drawing and other 2d graphic rendering. EMF+ file is one of the image file format that is rendered by the library. The vulnerability is based on some floating point calculation of an EMF+ path object. By transforming the format to BMP (flattening the pixels) and converting it back to EMF we are able to avoid the malicious calculation as the resulting file opens successfully without triggering any malicious behavior.

After conversion it opens successfully without DoS or code execution.

JP2 Format/Exploiting IrfanView

Various publication that describe how such a vulnerability is exploited can be found in the following links:
 a. http://web.nvd.nistgov/view/vuln/detail?vulnId=CVE-2012-0897
 b. http://www.greyhathacker.net/?p=525

IrfanView is vulnerable to a stack-based buffer overflow, caused by improper bounds checking by the JPEG2000 plug-in when processing the Quantization Default (QCD) marker segment. By persuading a victim to open a specially-crafted JPEG2000 file (.JP2), a remote attacker could overflow a buffer and execute arbitrary code on the system or cause the application to crash and potentially execute malicious code.

A first file of a JP2 format can be converted to a second file of a bitmap format, JPEG format or any other format that differs from JP2 format—and especially those formats that are expected to be immune to attempts to exploit JP2 format vulnerabilities.

MP4 Format/Exploiting RealPlayer

Various publication that describe how such a vulnerability is exploited can be found in the following links:
 a. http://web.nvd.nist.gov/view/vuln/detail?vulnId=CVE-2012-1904
 b. http://1337day.com/exploits/17823

A first file of a MP4 format can be converted to a second file of an AVI format, or any other audio-video format that differs from MP4 format—and especially those formats that are expected to be immune to attempts to exploit MP4 format vulnerabilities.

According to various embodiments of the invention the attack neutralization process can be executed by a computer that may act as an access point to a computerized system. It may be an email gateway or other file transfer method or system.

In this case the attack neutralization process can be preceded by access control and authentication processes that are aimed to prevent an-authorized persons from uploading documents to the computerized system. Furthermore, the attack neutralization process can be followed by sending a "clean" file to the computerized system—and especially to a repository of the computerized system.

Figure 2:
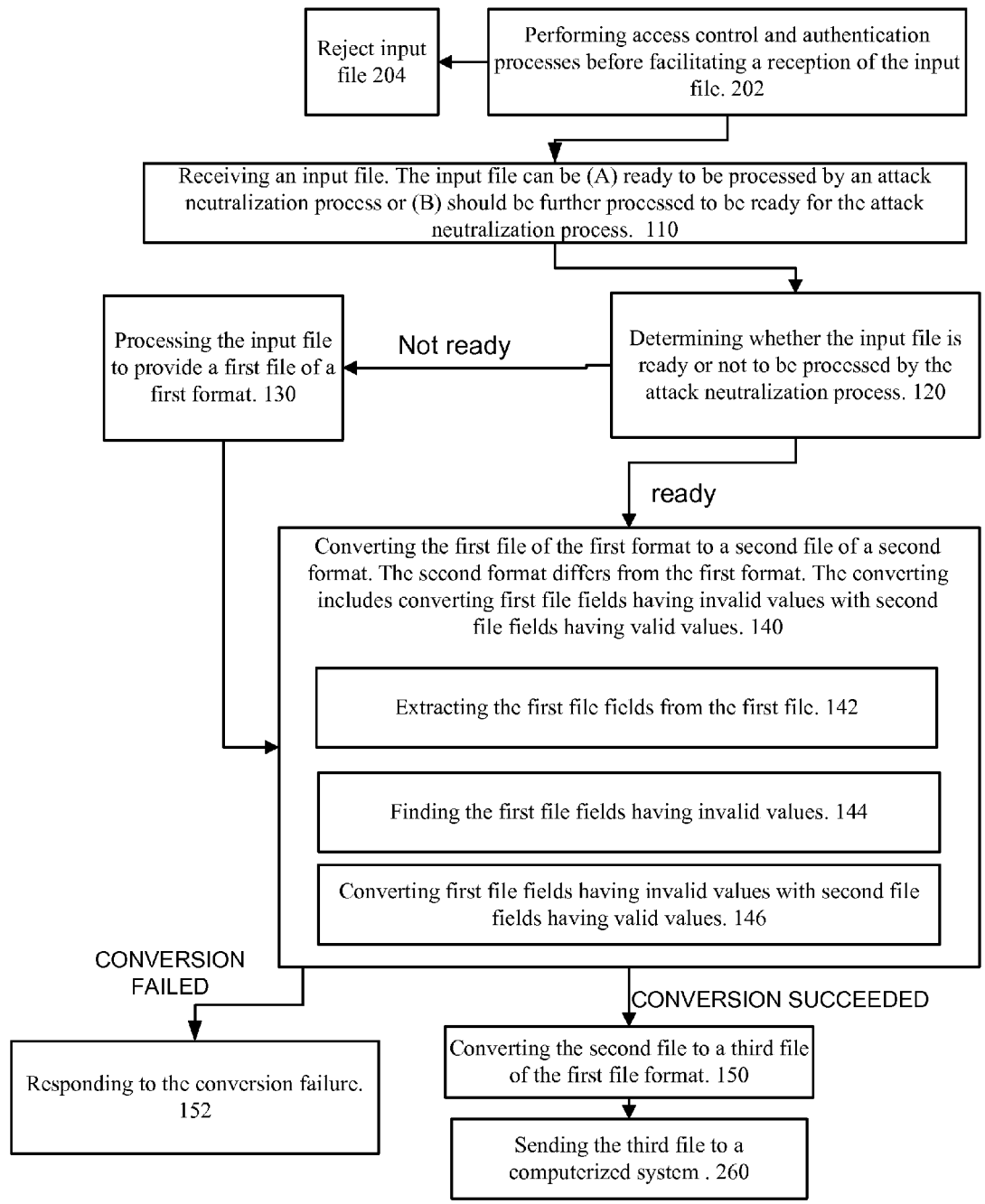
FIG. 2 illustrates a method according to an embodiment of the invention.

FIG. 2 illustrates method 200 according to an embodiment of the invention.

Method 200 differs from method 100 by including stages 202, 204, and 260.

Method 202 may start by stage 202 of performing access control and authentication processes before facilitating a reception of the input file. Any known authentication and access control methods can be used. For example, a person that wishes to provide an input file to the computerized system can undergo an authentication process to verify his identity. Non-limiting example of authentication process include biometric authentication processes, password based authentication processes, non-biometric authentication processes, key based authentication processes and the like.

If the authentication succeeded then the credentials (permissions) of the person are evaluated to determine whether that person can provide files to the computerized system—and if so determine which types of files that person can be allowed to provide. For example, the method can allow only some persons to upload executable files. Stage 202 included preventing a person to upload a file of a type that the person is not allowed by provide.

If the authentication and access control fails—the input file is rejected (204).

Stage 202 may also include preventing the computerized system (excluding the computer that acts as an access point) from receiving the first file.

If it is determined by stage 202 that a person can upload the input file he requests to upload then stage 202 is followed by stage 110 and all other stages (120-150) of method 100.

Stage 150 may be followed by stage 260 of sending the third file to a computerized system or to certain entities of the computerized system—and especially to a repository of the computerized system.

Figure 3:
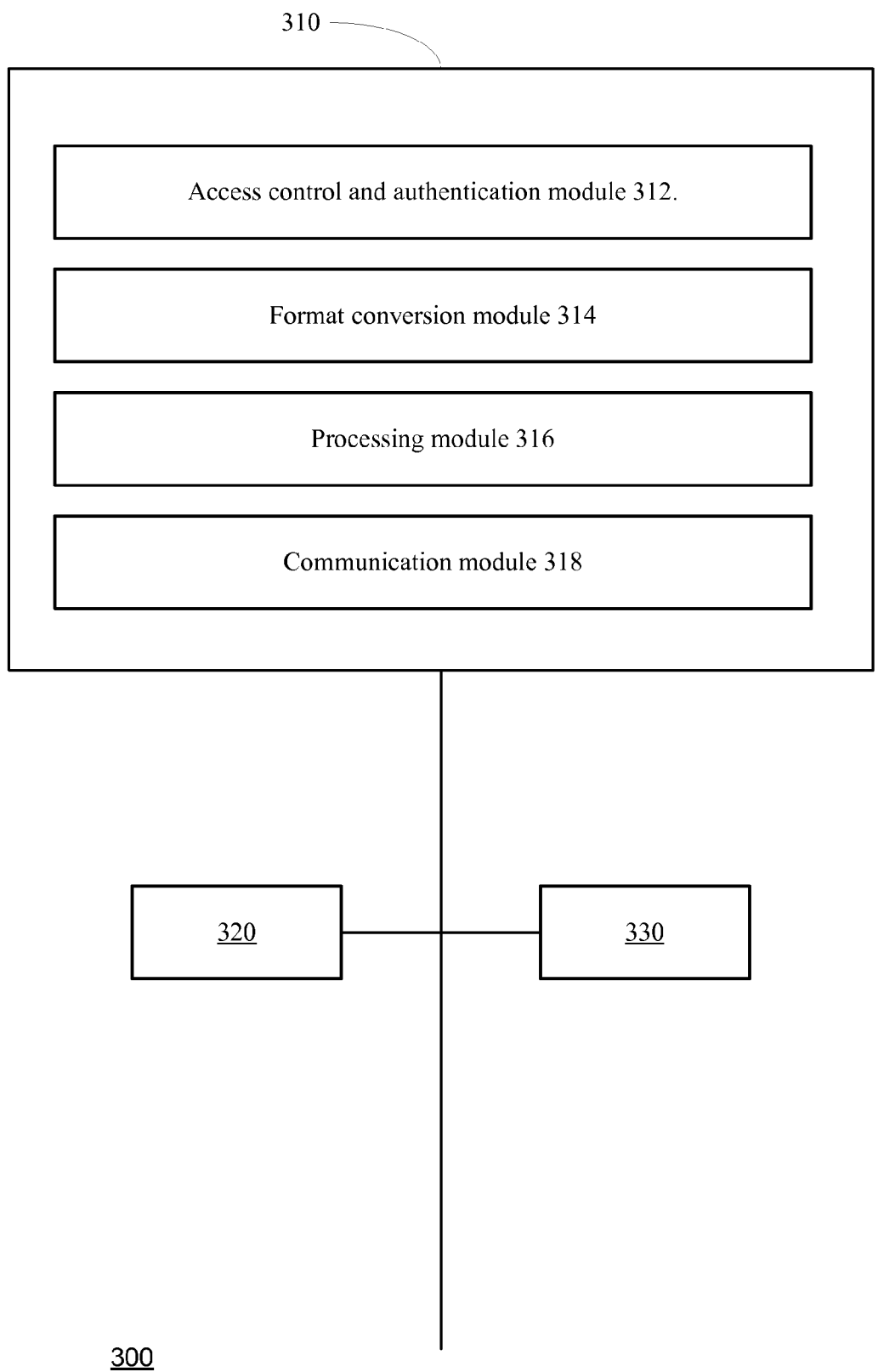
FIG. 3 illustrates a system according to an embodiment of the invention.

FIG. 3 illustrates a computerized system 300 according to an embodiment of the invention.

The computerized system 300 includes multiple computers 310 and 320, one of which can act as a repository or be coupled to a storage unit 330 that acts as a repository.

Computer 310 may be configured to act as an access point to the computerized system 300.

Computer 310 can execute any of the methods mentioned above. It can be a general purpose computer, a server, although it can be equipped with hardware or software that will prevent tampering attempts. For example, computer 310 can retrieve its operating system from read only medium such as a Compact Disc, Digital Video Disc or Blu-Ray Disk. It can include an access control and authentication module 312, a format conversion module 314, a processing module 316 and a communication module 318. Each of these modules can be executed by software, firmware, middleware and hardware. At least one of these modules is implemented by hardware. The hardware can include a processor, an image processor, a digital signal processor, a memory module and the like.

The computer 310 may be a read only computer that is immune to malware that resides on its target as the system is reverting to the original state periodically and after each sanitization cycle/transaction.

The access control and authentication module 312 may be arranged to perform access control and authentication processes before facilitating a reception of an input file. It may, for example, execute stage 202.

The communication module 318 may receive an input file from a user—if the access control and authentication module 312 approves the reception of the input file. The communication module 318 can prevent the distribution of the input file to other computers 320 of the computerized system 300 and may send the third file to other computers 320 of the computerized system 300.

The processing module 316 may be arranged to determine whether the input file is ready or not to be processed by the attack neutralization process. If it is determined that the input file is not ready then the processing module 316 may process the input file to provide a first file of a first format. The processing module 316 may be arranged to execute stages 120 and 130.

The format conversion module 314 is arranged to:
 a. Convert the first file of the first format to a second file of a second format. The second format differs from the first format. The converting includes converting first file fields having invalid values with second file fields having valid values.
 b. Convert the second file to a third file of the first file format.

The format conversion module 314 can be arranged to execute stage 140 and 150.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disc media (e.g., CD-ROM, CD-R, etc.) and digital video disc storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/ output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A non-transitory computer readable medium comprising instructions that, when executed by a processor, cause the processor to perform operations comprising:
   receiving a first file in a computer, wherein the first file comprises one or more file fields, each file field comprising a field length;
   determining that the first file is in a first format of a plurality of file formats, wherein each format of the plurality of file formats has valid values comprising expected legitimate field lengths and allowed field values for files in the respective format;
   extracting the one or more file fields from the first file;
   finding whether the one or more file fields from the first file have invalid values in comparison to the first format, the finding comprising:
      comparing the length of the extracted one or more file fields from the first file to the expected legitimate field lengths of the first format, wherein an invalid value comprises a length which exceeds the expected legitimate field length; and
      comparing the values of the extracted one or more file fields from the first file to the allowed field values of the first format, wherein an invalid value comprises a value other than the allowed field values;
   in response to finding that the one or more file fields from the first file has invalid values:
      selecting a second format from the plurality of file formats, wherein the second format is different from the first format and is selected at least in part because of different security vulnerabilities than the first format; and
      converting the first file to a second file of the second format, the converting comprising:
         truncating a first file field of the first file which exceeds the expected legitimate field length of the first format;
         mapping a second file field of the first file which has a value other than the allowed field values of the first format to a value which is an allowed field value of the first format; and
         allowing performance of at least a subset of operations on the second file that can be performed on the first file;
   indicating a presence of malicious code in the first file when the converting the first file to a second file of the second format fails, the indicating comprising at least one out of:
      notifying a user of the presence of the malicious code, generating an attack alert, declaring the first file an infected file, deleting the first file, and quarantining the first file;
   in response to successfully converting the first file to a second file of the second format:
      converting the second file to a third file of the first format, wherein the first file field and the second file field of the second file have valid values in the third file;
      sending the third file to a clean file repository in the computer; and
      preventing the clean file repository from receiving the first file.

2. The non-transitory computer readable medium according to claim 1, wherein the second format is expected to be immune to attempts to exploit vulnerabilities of the first format.

3. The non-transitory computer readable medium according to claim 1, wherein the first file and the third file are similar to each other.

4. The non-transitory computer readable medium according to claim 1,
   wherein one or more file fields of the first file comprise first file image fields; and
   wherein the converting further comprises transforming the first file image fields to second file image fields on a pixel to pixel basis.

5. The non-transitory computer readable medium according to claim 1,
   wherein one or more file fields of the first file comprise first file image fields; and
   wherein the converting further comprises transforming the first file image fields to second file image fields of a raw format.

6. The non-transitory computer readable medium according to claim 1, wherein the first format comprises one out of tagged image file format (TIFF), portable network graphics (PNG), enhanced metafile (EMF), and joint photographic experts group 2000 (JP2).

7. The non-transitory computer readable medium according to claim 6, wherein the second format is a bitmap format.

8. The non-transitory computer readable medium according to claim 1, wherein the first format and the second format are video formats.

9. The non-transitory computer readable medium according to claim 1, wherein the first format and the second format are audio formats.

10. The non-transitory computer readable medium according to claim 1, wherein receiving the first file in the computer further comprises:
    wherein the first file is compressed; and
    applying at least one decompression operation on the compressed first file.

11. The non-transitory computer readable medium according to claim 1, wherein the first format and the second format are text editing formats.

12. The non-transitory computer readable medium according to claim 1, wherein the first format and second format are supported by different software vendors.

13. The non-transitory computer readable medium according to claim 1, wherein the first format and second format are supported by a same software vendor.

14. A method for neutralizing computer file attacks, the method comprising:
    receiving a first file in a computer, wherein the first file comprises one or more file fields, each file field comprising a field length;
    determining that the first file is in a first format of a plurality of file formats, wherein each format of the plurality of file formats has valid values comprising expected legitimate field lengths and allowed field values for files in the respective format;
    extracting the one or more file fields from the first file;
    finding whether the one or more file fields from the first file have invalid values in comparison to the first format, the finding comprising:
       comparing the length of the extracted one or more file fields from the first file to the expected legitimate field lengths of the first format, wherein an invalid value comprises a length which exceeds the expected legitimate field length; and comparing the values of the extracted one or more file fields from the first file to the allowed field values of the first format, wherein an invalid value comprises a value other than the allowed field values;

in response to finding that the one or more file fields from the first file has invalid values:

selecting a second format from the plurality of file formats, wherein the second format is different from the first format and is selected at least in part because of different security vulnerabilities than the first format; and converting the first file to a second file of the second format, the converting comprising:

truncating a first file field of the first file which exceeds the expected legitimate field length of the first format;

mapping a second file field of the first file which has a value other than the allowed field values of the first format to a value which is an allowed field value of the first format; and allowing performance of at least a subset of operations on the second file that can be performed on the first file;

indicating a presence of malicious code in the first file when the converting the first file to a second file of the second format fails, the indicating comprising at least one out of:

notifying a user of the presence of the malicious code, generating an attack alert, declaring the first file an infected file, deleting the first file, and quarantining the first file;

in response to successfully converting the first file to a second file of the second format:

converting the second file to a third file of the first format, wherein the first file field and the second file field of the second file have valid values in the third file;

sending the third file to a clean file repository in the computer; and preventing the clean file repository from receiving the first file.

\* \* \* \* \*